United States Patent [19]

Cassagne

[11] 4,231,095
[45] Oct. 28, 1980

[54] REMOTE REPRODUCTION OF IMAGES

[75] Inventor: Pierre Cassagne, Rueil, France

[73] Assignee: MATRA, Paris, France

[21] Appl. No.: 906,211

[22] Filed: May 15, 1978

[30] Foreign Application Priority Data

May 16, 1977 [FR] France ................. 77 14985

[51] Int. Cl.$^3$ .................. G06F 15/20; H04N 7/12
[52] U.S. Cl. ....................... 364/515; 358/260
[58] Field of Search .......... 358/260, 263, 261, 262, 358/903, 133, 138; 364/514, 515, 518, 521

[56] References Cited

U.S. PATENT DOCUMENTS

| | | | |
|---|---|---|---|
| 3,909,514 | 9/1975 | Tanaka et al. | 358/260 |
| 3,916,095 | 10/1975 | Weber et al. | 358/261 |
| 4,117,517 | 9/1978 | Shintani et al. | 358/260 |

FOREIGN PATENT DOCUMENTS

| | | | |
|---|---|---|---|
| 2224066 | 12/1973 | Fed. Rep. of Germany | 358/260 |
| 1418839 | 12/1975 | United Kingdom | 358/260 |

Primary Examiner—Joseph F. Ruggiero
Attorney, Agent, or Firm—Larson, Taylor & Hinds

[57] ABSTRACT

An image represented by samples $N_{o,o}$, $N_{2,o}$, ..., $N_{2p,o}$, ..., $N_{o,2}$, ..., $N_{o,2q}$, ..., $N_{2p,2q}$, ..., distributed over a two-dimensional pattern and each represented by a quantified signal, generally at two levels, is restored. From samples such as $N_{2p,2q}$, are reconstituted samples such as $m_{2p,2q}$, $m_{2p+1,2q}$, $m_{2p,2q+1}$, $m_{2p+1,2q+1}$, quadruple in number. The values of the four samples are generated according to the expansion relationships:

$$\begin{cases} m_{2p,2q} = N_{2p,2q} + [N_{2(p+1),2q} \times N_{2p,2(q+1)}] \\ m_{2p+1,2q} = N_{2(p+1),2q} + [N_{2p,2q} \times N_{2(p+1),2(q+1)}] \\ m_{2p,2q+1} = N_{2p,2(q+1)} + [N_{2p,2q} \times N_{2(p+1),2(q+1)}] \\ m_{2p+1,2q+1} = N_{2(p+1),2(q+1)} + [N_{2(p+1),2q} \times N_{2p,2(q+1)}] \end{cases}$$

The samples N are typically obtained by a compression process.

7 Claims, 12 Drawing Figures

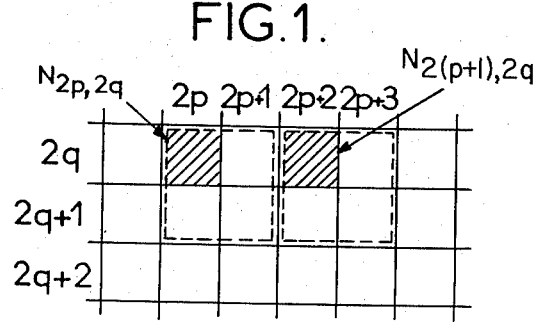
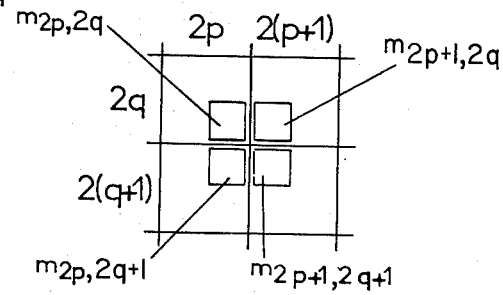
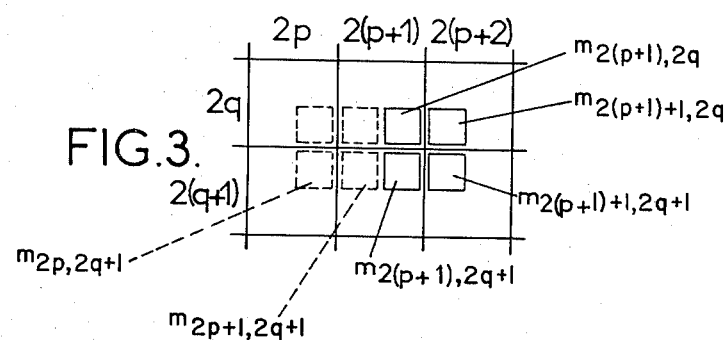
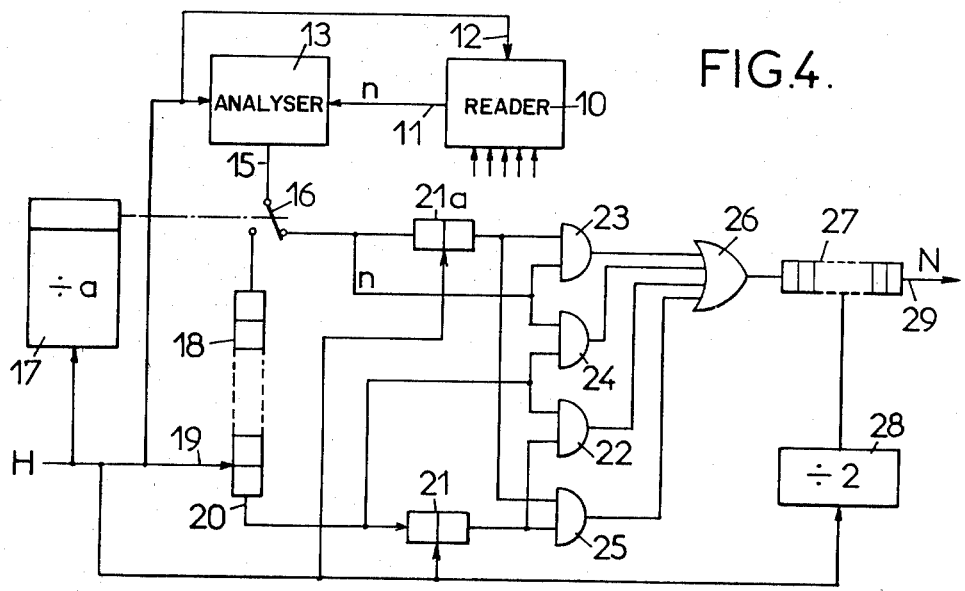

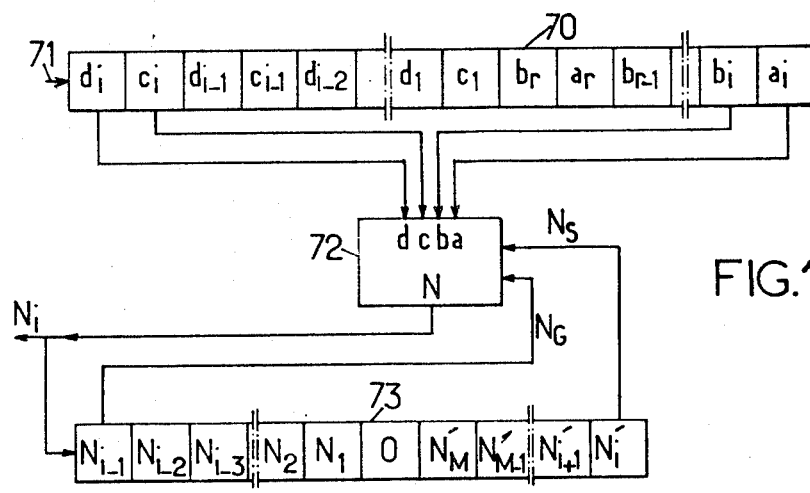
FIG. 10.
FIG. 9.
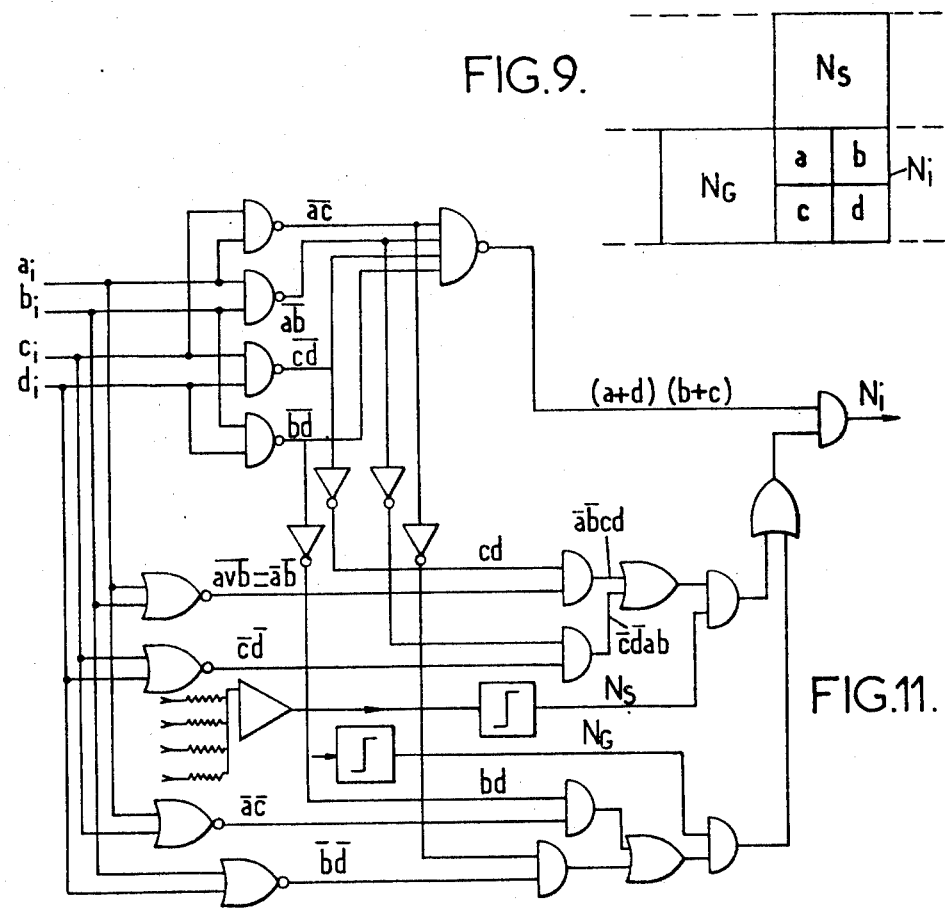
FIG. 11.

REMOTE REPRODUCTION OF IMAGES

BACKGROUND AND SUMMARY OF THE INVENTION

The present invention relates to the reconstitution or restoration of images from samples distributed over a two-dimensional frame and each represented by a quantified generally binary signal, and to the reproduction of images at a remote location by scan analysis of the original image, sampling, coding, transmission over any channel (typically over a telephone line) and reconstitution at the remote location.

More precisely, methods for reproduction of documents at a remote distance are known in which successive rows of the original document are sampled for generating a large number of image elements, each of which has identifying coordinates x and y in a frame and is associated with a binary digit indicating if it must be considered as "black" or "white".

Each sample being located at random manner with respect to the pattern borne by the document (lines of a drawing or alphanumerical characters), each sample has to be processed for determining whether a binary "0" or "1" is to be applied thereto, according to the value of its mean luminance, by comparison with the range of the luminances over the whole of the document. The binary discreteness (decision on the luminance level) and spatial discreteness (due to the random localization of the sample) detrimentally affect the message data from the beginning and correspond to an alteration of the contours. The smaller the image element, the weaker the degradation. An analysis with eight image elements per millimeter provides a satisfactory discreteness in the case of typed texts. As a counterpart, the volume of data to be transmitted is extremely large. With four elements per millimeter, the volume of data is divided by 4, but the image is so degraded that after reconstitution the text becomes difficult to read and there are ambiguities between various figures and letters.

It is an object of the invention to provide an image reconstitution method which reconstitutes a higher number of elements than that which has been transmitted by using the correlation between adjacent elements and correlatively improves the resolution.

According to an aspect of the invention, there is provided a method for reconstitution of an image from samples $N_{o,o}, N_{2,o}, \ldots, N_{2p,o}, \ldots, N_{o,2}, \ldots, N_{o,2q}, \ldots N_{2P,2q}, \ldots$ distributed over a two-dimensional matrix and each represented by a quantified signal, wherein four samples $m_{2p,2q}$, $m_{2p+1,2q}$, $m_{2p,2q+1}$, $m_{2p+1,2q+1}$ are reconstituted from the samples $N_{2p,2q}$ and the like according to the expansion algorithm:

$$\begin{cases} m_{2p,2q} &= N_{2p,2q} + [N_{2(p+1),2q} \times N_{2p,2(q+1)}] \\ m_{2p+1,2q} &= N_{2(p+1),2q} + [N_{2p,2q} \times N_{2(p+1),2(q+1)}] \\ m_{2p,2q+1} &= N_{2p,2(q+1)} + [N_{2p,2q} \times N_{2(p+1),2(q+1)}] \\ m_{2p+1,2q+1} &= N_{2(p+1),2(q+1)} + [N_{2(p+1),2q} \times N_{2p,2(q+1)}] \end{cases}$$

and the quantified signals m are applied to a reproduction apparatus having a frame homothetic with the frame defining samples N. The samples are typically quantified at two levels, 0 and 1. Then the "+" and "×" symbols should be understood as designating the conventional boolean (rather than arithmetic) operations. It should further be understood that the above algorithm may be written in other equivalent forms, as will be seen later. The reconstitution method is applicable to any message consisting of data obtained by analysis with low resolution. However, it is particularly advantageous in transmission methods in which there is successive compression of data obtained by high resolution analysis, then transmission of the compressed data whose degree of cross-correlation has been reduced by the compression operation. The reconstituted image than has a resolution which is approaching that obtained by direct printing of the original message generated. during the analysis operation.

The original image will frequently be analysed in horizontal and vertical directions, since such directions are statistically frequent in documents bearing alphanumeric indications. However, the scanning frame can have two differently oriented directions.

According to a second aspect of the invention, there is provided a reproduction method in which a reconstitution method as defined above is applied to signals received over a transmission line and originating from a data compression coding method. During the compression, the samples N which will be transmitted are generated from initial samples $n_{o,o}, n_{1,o}, n_{2,o}, \ldots, n_{p,o}, \ldots, n_{p,q}, n_{p+1,q}, \ldots$ distributed over a two-directional frame, according to the algorithm:

$$N_{2p,2q} = [n_{2p,2q} \times n_{2p+1,2q}] + [n_{2p,2q+1} \times n_{2p+1,2q+1}] + [n_{2p,2q} \times n_{2p,2q+1}] + [n_{2p+1,2q} \times n_{2p+1,2q+1}]$$

According to an other aspect of the invention, image reproduction and reconstitution systems adapted to carry out the abovementioned methods are provided. Such systems can be constituted using simple logic circuits only. Whatever the embodiment used, the reconstitution is effected with accentuation and smoothing along the two directions of the frame, which increases the legibility of texts and renders the reproduction of graphs less statistically dependent on the sampling spatial "phase", that is on the position of the sampled elements with respect to the characters.

The invention will be better understood from the following description of particular embodiments given by way of examples. The description refers to the accompanying drawings.

SHORT DESCRIPTION OF THE DRAWINGS

FIG. 1 is a schematic diagram showing the factors which come into play in the mode of generating samples such as N from the initial samples n;

FIGS. 2 and 3 are diagrams showing the elements which are involved in the generation of two successive groups of four points m of the image, according to the reconstitution process, from samples N;

FIG. 4 shows, in diagrammatic form, a data compression sample generation circuit, for creating samples N suitable for use by the circuit of FIG. 6 or 8 after transmission;

Figure 6:
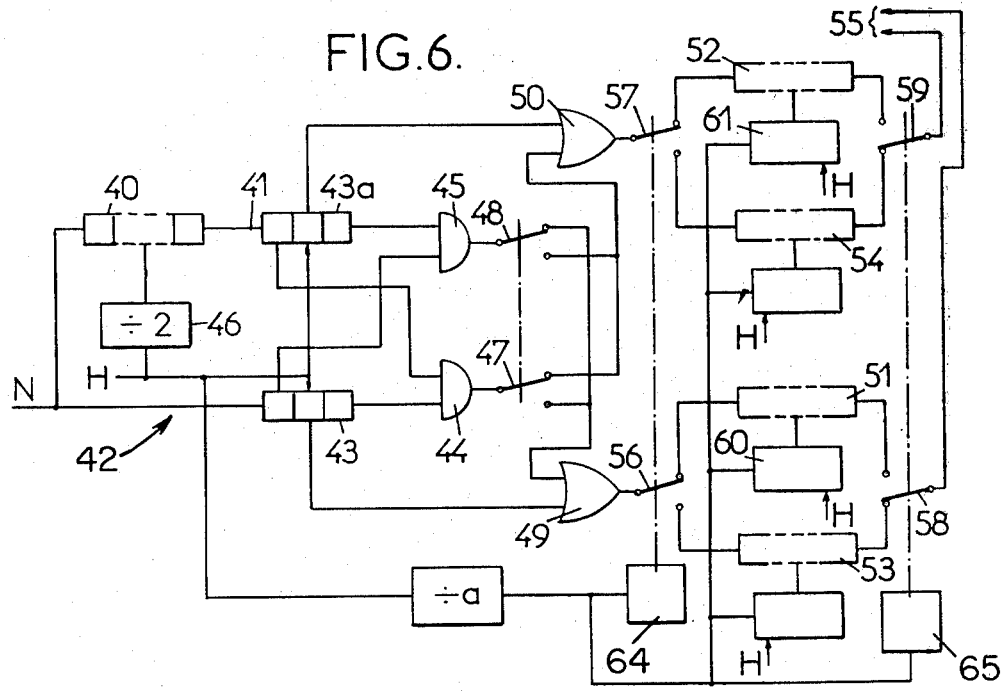
FIG. 6 is a simplified block diagram of a reconstitution circuit.
Figure 7:
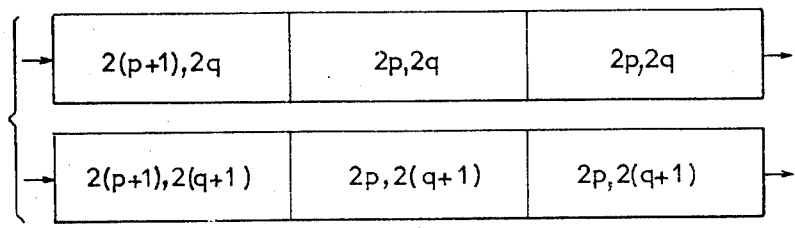
Figure 7A:
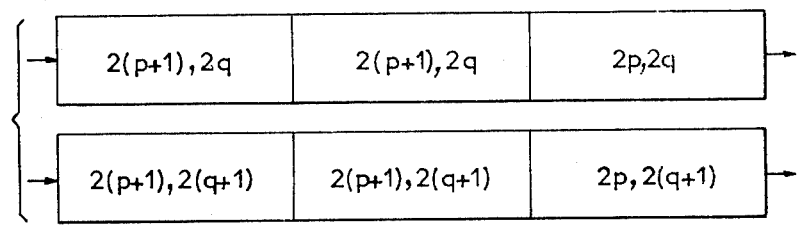
Figure 8:
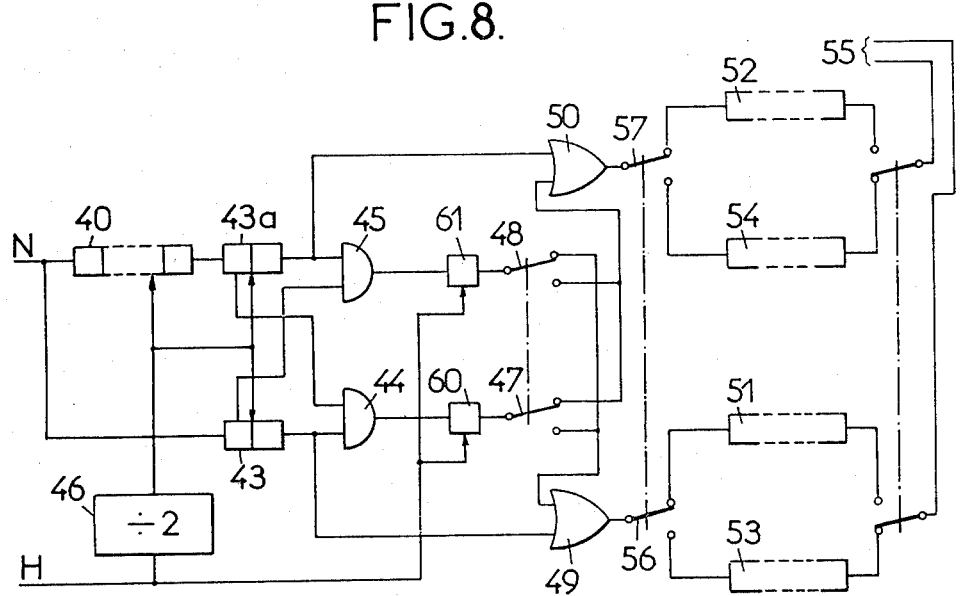

FIGS. 7 and 7a indicate the content of registers of the circuit of FIG. 6 on receipt of two successive clock pulses;

FIG. 8 shows a modification of the circuit of FIG. 6;

FIG. 9 is a representation of the samples which are used in a refinement of the compression method;

FIG. 10 is a simplified block diagram of components for carrying out the method represented in FIG. 9;

FIG. 11 is a block diagram illustrating how the structure of the system of FIG. 10 may be simplified if a matrix of optical transducers is used for scanning the original image.

DETAILED DESCRIPTION OF PREFERRED EMBODIMENTS

For purpose of clarity, it will be assumed that the various circuits shown are incorporated in a system for the remote reproduction of images constituted in totality or in part of alphanumeric characters whose size is that currently used for printed texts or typewritten texts. Then, it will generally be advantageous to scan the image bearing document by television-type scanning in two perpendicular directions of which one is parallel to the direction of writing. The term "line" will denote any row constituted of aligned samples which are successively or simultaneously explored (with, in the latter case, multiplexing so that the samples are applied in succession to the circuit generating the signals to be transmitted), before the samples of a further row parallel to the first are scanned. "Column" will denote any row of samples perpendicular to the lines. In general, the samples will be distributed according to a square matrix. It will also be assumed that each of the sample is quantified at one or another of two levels 0 and 1 represented by two different values of the same electrical magnitude, one corresponding to black, the other to white.

Scanning of the image will thus provide samples corresponding to successive lines:
a first line of samples which will be denoted $n_{o,o}$, $n_{1,o}$, ..., $n_{p,o}$, ..., $n_{a,o}$;
a second line of samples $n_{o,1}$, $n_{1,1}$, ..., $n_{p,1}$, ..., $n_{a,1}$;
$a(q+1)$th line of samples $n_{o,q}$, ..., $n_{p,q}$, ... $n_{a,q}$, and so on up to a $(b+1)$th and last line, for which the samples will be $n_{o,b}$, $n_{1,b}$, ... $n_{p,b}$, ... $n_{a,b}$.

The following compression algorithm is applied to the samples n, each represented by a single bit:

$$N_{2p,2q} = [n_{2p,2q} \times n_{2p+1,2q}] + [n_{2p,2q+1} \times n_{2p+1,2q+1}] + [n_{2p,2q} \times n_{2p,2q+1}] \times [n_{2p+1,2q} \times n_{2p+1,2q+1}] \quad (I)$$

which can be written:

$$N_{2p,2q} = [n_{2p,2q} + n_{2p+1,2q+1}] \times [n_{2p+1,2q} + n_{2p,2q+1}] \quad (II)$$

and generates N samples which are distributed as indicated diagrammatically in FIG. 1 with reference to samples $N_{2p,2q}$ and $N_{2(p+1),2q}$. The surface area of each current element N will be four times larger than the area of any one of the initial elements n hence one element N replaces four elements n. But its value will be the result of an averaging of those of the four elementary points, taking into account the relative position of these four points and the logic level which is affected to them and depends on the luminance thereof.

The coded samples N may then be transmitted according to any predetermined sequence, for instance in successive horizontal lines or according to any other arrangement with appropriate addressing. Transmission can be on any type of communication channel.

On reception, there will be available samples corresponding to dots distributed in lines and in columns with a distance double the distance between the original dots corresponding to samples n. Four samples or adjacent elements located at the apices of a square, will be denoted by:

$N_{2p,2q}$; $N_{2(p+1),2q}$; $N_{2p,2(q+1)}$; and $N_{2(p+1),2(q+1)}$

An expansion operator will be applied to samples N whereby each combination of four samples N (p and q being integers) generates four new elements:

$m_{2p,2q}$; $m_{2p+1,2q}$; $m_{2p,2q+1}$; and $m_{2p+1,2q+1}$

The expansion operator can be defined by the logic equations:

$$\begin{cases} m_{2p,2q} = N_{2p,2q} + [N_{2(p+1),2q} \times N_{2p,2(q+1)}] \\ m_{2p+1,2q} = N_{2(p+1),2q} + [N_{2p,2q} \times N_{2(p+1),2(q+1)}] \\ m_{2p,2q+1} = N_{2p,2(q+1)} + [N_{2p,2q} \times N_{2(p+1),2(q+1)}] \\ m_{2p+1,2q+1} = N_{2(p+1),2(q+1)} + [N_{2(p+1),2q} \times N_{2p,2(q+1)}] \end{cases} \quad (III)$$

Referring to FIG. 2, there is shown how the reconstitution is carried out for the group of the four samples N mentioned above. The equations are then applied to the next group of four adjacent samples N, including two samples N in common with the previously processed group. Referring to the diagrammatic illustration in FIG. 3, the equations are applied on successive groups of four samples, each time with a shift of one element N in the line (horizontal). Once the samples N belonging to lines $2q$ and $2(q+1)$ have been processed, the groups of four samples N belonging to lines $2(q+1)$ and $2(q+2)$ are processed.

It is seen that each element N is used four times to define, in association with three adjacent elements, four points m in total. The original resolution will be restored approximately on condition that the finest details of the original image have thickness which are at least equal to the size of a sampling element n.

By way of example, a scan at the rate of eight points per millimeter of an original document carrying typewritten alphanumerical characters makes it possible to reconstitute the characters with a general shape in close conformity with the original shape. The only appreciable degradation resides in a tendency of thickening of black lines whose surface may increase in a ratio lesser than 40%, corresponding to an increase of 10% along any direction.

Other equations grouping four adjacent points, during the compression and/or expansion, can be used, particularly bearing in mind that equations (III) may be written differently.

There will now be described, with reference to FIG. 4, a compression circuit generating samples N which are sent to a transmission channel from samples n supplied by an analyser.

Referring to FIG. 4, there is shown a circuit which includes an analyser 13 which receives samples n from a reader 10. Assuming that the reader is provided for simultaneously sampling eight elements per millimeter located on a horizontal line of a sheet of standard width, that is to say 210 mm, it will supply 1728 samples n per line. Reader 10 has a multiplexing device which will apply the samples in sequence at the output 11, at a rate determined by the frequency of the pulses coming from a clock H (not shown) which are applied at its input 12. The analyser will provide quantized binary signals n each representing one of the samples that it receives and which represent the mean luminances of dot elements.

Instead of scanning successive lines, the reader can be arranged to read along successive columns over part of the length (vertical size) of the document: reference can be made to French Patent Application No. 77 14643 filed May 13, 1977 published under No. 2,390,866 for a description of such a scanning device. It carries out, for example, a sampling of 64 elements along successive vertical lines, at the rate of eight elements per millimeter, and eight lines per millimeter. However other types of conventional readers may be used.

Successive elements of the first line, then of the second line, and so on, appear in sequence on the output 15 of analyser 13 at a rate fixed by the clock H and in the form of binary electrical signals. It will first be assumed that a binary "1" represents a black element, i.e. an element whose luminance is lower than a predetermined threshold.

The output 15 is connected to a switch 16 which directs the signals corresponding to the even lines of scanning to a first channel and those corresponding to the odd lines to a second channel (or inversely, on condition that the arrangement is not changed during operation). This operation of alternation can be controlled from the clock H, by means of a divider 17 constituted by a cascade of counters of a capacity equal to the number of elements per line. Switch 16 may comprise two field effect transistors each associated with one of the channels, alternately rendered conductive by a flip-flop constituting the last stage of the divider 17.

The channel associated with the even lines includes an input member constituted by a shift register 18 having a number of binary positions equal to the number of elements n per line. Responsive to each clock pulse received on the shift control input 19, the contents of the register is shifted by one stage towards its output 20 and the signal applied at the data input by switch 16 is entered into the first stage.

The output 20 is connected to a shifting memory 21 with two binary positions, which can be identical with a memory 21a.

The outputs of memories 21 and 21a are connected to the input ports of AND gates arranged to provide the values of N according to equations (I).

Considering what occurs for a particular line, gate 22 receives the binary values $n_{2p, 2q}$ and $n_{2p+1,2q}$ and supplies at its output the first term of equation (I). Simultaneously, the two inputs of each of the other AND gates 23, 24 and 25 are connected so that these gates provide the other terms of equation (I). The outputs of the AND gates 22, 23, 24 and 25 are applied to the inputs of an OR gate 26 which hence provides $N_{2p,2q}$.

Successive values N are entered into a buffer register 27 whose shift control input receives pulses at half-clock frequency provided by a divider by two 28. The function of the register 27 is to provide a steady flow of data to the transmission system; register 27 distributes the data corresponding to one line over the time of analysis of two lines to avoid breaking transmission into cycles alternately active and passive.

Upon the clock pulse following the time of appearance of $N_{2p,2q}$ at the output of gate 26, the content of the registers 18, 21 and 21a is shifted forward by one step. The new element $N_{2p+1,2q}$ which appears at the output of the OR gate 26 is not entered into the buffer register 27 since the latter then does not receive a control pulse coming from the divider 28 and that element is disregarded.

Two clock pulses after generation and loading of element $N_{2p,2q}$ a new element $N_{2(p+1),2q}$ will be loaded for transmission.

The above-described sequence can be carried out in vertical lines and not in horizontal lines without however modifying the results. It is only necessary to adapt the capacity of the shift registers 18 and 27 to the number of elements of each vertical line.

It will be noted that the alternation phase of the switch 16 and the phase of the signal coming from the divider 28, which define the horizontal and vertical parity of the elements N which are effectively used, can be combined in four different ways, with results which are slightly different but practically equivalent from the point of view of quality. It is the initial condition of the circuits at the beginning of transmission which determines that of the four possible configurations (which differ by a shift of one vertical or horizontal element) which will be transmitted. It is sufficient that the same arrangement be preserved from the beginning until the end of the analysis of the document.

Figure 5:
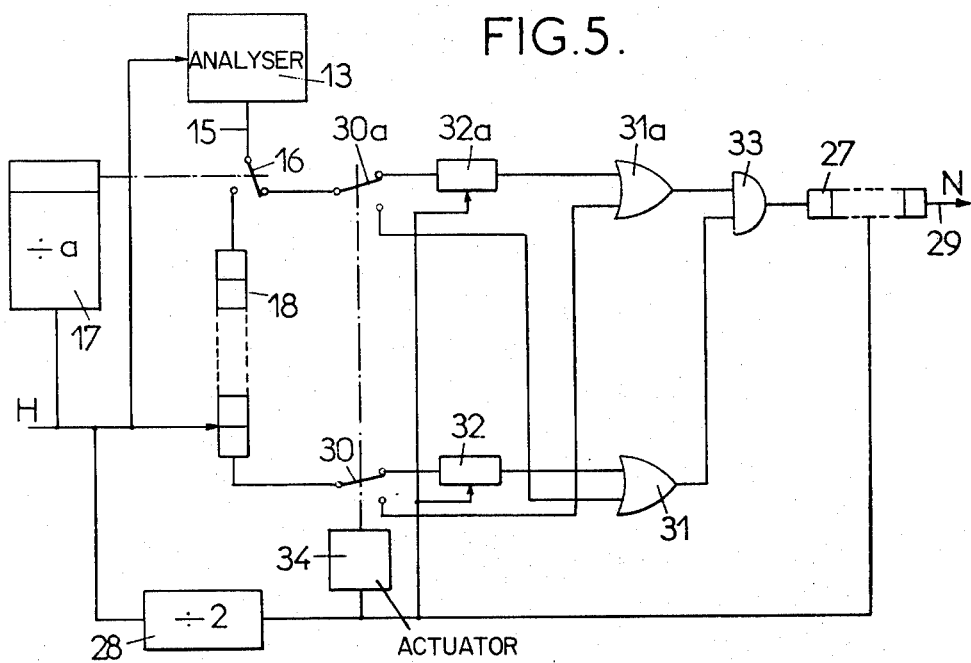
FIG. 5 shows a modification of the circuit of FIG. 4.

Instead of the circuit of FIG. 4, which applies equation (I), it is possible to use that of FIG. 5, which is in accordance with expression (II) and is slightly simpler in design. Those circuit elements of FIG. 5 which correspond to the elements already shown in FIG. 4 are denoted by the same reference numeral for simplicity.

In the embodiment of FIG. 5, the signals from analyser 13 are alternatively applied directly to a first branch 30a of a double inverter and through register 18 to a second branch 30 of the inverter, actuated at the half-frequency of the clock. To simplify, in FIG. 5 there is shown the inverter control in the form of an actuating member 34 which receives the output signals from the divider by two. The double inverter 30, 30a routes the image elements either to a direct channel or to a memory channel depending upon whether they have an order of even or uneven rank in the line. The memory channels which receive the even elements n each include a register 32 or 32a with one memory position while registers 21 and 21a (FIG. 4) have two binary positions. The registers are actuated at half the clock rate by the divider 28 (while they received shift pulses at the clock rate in the embodiment of FIG. 4).

First and second OR gates 31 and 31a are connected to the direct and memory channels so that the first receives $n_{2p,2q+1}$ and $n_{2p+1,2q}$ and the second receives $n_{2p,2q}$ and $n_{2p+1,2q+1}$ at its inputs. The outputs of the OR gates 31 and 31a thus deliver the two terms between brackets of equation (II) to a single AND gate 33 which produces the result of equation (II). That result is stored, as in FIG. 4, in a buffer register 27 driven at half the clock frequency by divider 28.

The result obtained is equivalent to that supplied by the circuit of FIG. 4, as long as the clock phase is appropriately related to that of the double inverter control 30, 30a.

Other embodiments ar possible. For example, it is possible to use an analyser which simultaneously delivers four elements $n_{i,j}$ of two adjacent lines over two distinct channels or over a single multiplexed channel. The buffer registers 18 and 27, as well as the inverter 16, then become unnecessary to obtain a steady flow of data.

Turning now to FIG. 6, there is diagrammatically shown a reconstitution circuit which is suitable for processing the signals provided by the circuit of FIG. 4 or 5. It comprises a conventional receiver (not shown)

which receives the signals N and applies them to two channels in parallel relation.

One of the channels, which will be called the "delayed" channel, comprises a shift register 40 of suitable capacity to store all the signals N from a complete line of the original image. The output of the register 40 is applied to the input of a register having three binary locations 43a. The other channel, which can be called the "direct" or "prompt" channel, has a shift register 43, also with three binary locations.

A clock H provides pulses at the transmission sampling rate (which may be derived from the signals on the transmission line). The shift register 40 is controlled by pulses at half-clock frequency, provided by the divider 46, while the registers 43 and 43a receive pulses at clock frequency, that is to say at double frequency of the rate of input of the data N.

After a full line has been entered into register 40, one clock pulse out of two will cause a new binary element N to appear at the output 41 of register 40. That element N represents the dot having the same abscissa as that which is available at 42 (at the input of the direct channel), but belonging to the following line.

The two registers 43 and 43a store two adjacent binary elements whose progression along the registers will permit disposing simultaneously of two groups of four elements N. At time $t_0$, these elements will be for example $N_{2p,2q}$; $N_{2(p+1),2q}$; $N_{2p,2(q+1)}$; and $N_{2(p+1),2(q+1)}$.

Two AND gates 44 and 45 have their inputs connected to receive the contents of stages of the register 43 and 43a selected so that these gates provide at moment $t_0$ the result of the logic operations:

$$N_{2p,2q} \times N_{2(p+1),2(q+1)} \quad \text{for 45}$$
$$N_{2(p+1),2q} \times N_{2p,2(q+1)} \quad \text{for 44.}$$

A double inverter 47, 48 driven at the clock frequency receives the output signals from gates 44 and 45, respectively, and routes them alternatively to an OR gate 49 and an OR gate 50. An additional input of OR gate 49 is connected, for the gate 49, to the middle position of register 43; an additional input of gate 50 is connected to the middle position of register 43a.

For greater clarity, in FIG. 7 there is indicated the indices of the elements N stored at time $t_0$ when the element $N_{2p,2q}$ reaches the last binary position of register 43a and the element $N_{2p,2(q+1)}$ reaches the last binary position of register 43. It is seen that the OR gate will then provide the element $m_{2p,2q+1}$ by logical addition. Gate 50 will simultaneously supply the element $m_{2p,2q}$.

One clock pulse later, at time $t_1$, the contents of registers 43 and 43a has become as shown in FIG. 7a. The gate 45 still supplies $N_{2p,2q} \times N_{2(p+1),2(q+1)}$. On the other hand, since the condition of the double inverter 47, 48 has changed,
the addition in OR gate 50 will provide $m_{2p+1,2q}$, the following element in row $2q$,
the addition in OR gate 49 will provide $m_{2p+1,2q+1}$, the following element of row $2q+1$.

In the same way, two clock pulses later, at time $t_2$, elements $m_{2(p+1),2q}$ and $m_{2(p+1),2q+1}$ will respectively be available at the outputs of gates 50 and 49.

The reconstituted elements in lines $2q$ and $2q+1$ (FIG. 3) are stored in registers 51 and 52 whose shift control inputs receive signals at clock fequency supplied through routing switches 60 and 61 which are inverted each time that a complete line has been loaded.

While registers 51 and 52 are being loaded a second set of two registers 53 and 54, which have stored the elements m of the two preceding lines, is discharged at clock rate at 55 toward display or recording means which need not be described since they can be entirely conventional.

The permutation of the shift registers for loading and unloading can be effected by two sets of double switches 56, 57 and 58, 59 controlled from a dividing circuit providing one control pulse each time it has received a clock pulses (a being the number of elements m in a line) which is applied to actuators 64 and 65.

Instead of using four registers 51, 52, 53, 54, it is possible to use only two registers, each simultaneously used to store elements m and to deliver elements m. The two registers are then unloaded in succession, except if the reproduction means which provides the final display or record is designed to write two lines simultaneously.

As for generating the elements N, various combinations of conditions may exist depending on the relative spatial phase of the elements. However, in practice substantially equivalent results are obtained, as regards quality of reproduction at least.

A same apparatus can be utilized alternately to scan an original document, generate elements N and transmit them during a phase of operation, and to provide a reconstituted copy of a document from data that it receives. The circuits used in transmission and reception including numerous similar parts, numerous duplications of parts can be avoided in a combined apparatus, while it is however possible to design an apparatus for transmission or reception only.

Numerous modifications of the reception circuit are possible in the same way as the transmission circuit. Such a modification is given by way of example in FIG. 8, where the elements corresponding to those of FIG. 6 are denoted by the same reference numerals.

Referring to FIG. 8, the registers 43 and 43a have only two one-bit positions memory and they are driven at half the clock frequency. An additional register having one binary position 60 and 61 is provided immediately downstream of each AND gate 44 or 45. Shift of the registers 43a and 43 must be actuated between times $t_0$ and $t_1$, then between moments $t_2$ and $t_3$, for the products $N_{2p,2q} \times N_{2(p+1),2(q+1)}$ and $N_{2(p+1),2q} \times N_{2p,2(q+1)}$ to remain available at times $t_0$ and $t_1$; then $m_{2p,2q}$ and $m_{2p,2q+1}$ are computed at time $t_0$ and $m_{2p+1,2q}$ and $m_{2(p+1),2(q+1)}$ at time $t_1$.

While the systems which have been described with reference to FIGS. 1-8 give satisfactory results in most cases, they are subject to a limitation. Due to the lack of symmetry of the boolean operators which are used in formulae (III) as compared with the current mathematical averaging, there is a slight change in the ratio of the black and white samples. When specific reference is made to type-written or hand-written messages in black on white, with typical resolution and when a "black" sample is represented by a binary 1, there is an increase in the proportion of black dots which may attain 3 or 4% as a result of the restoration and expansion of the information.

That difficulty may be overcome, if necessary, by representing "white" samples with a binary 1. The percentage of white dots will consequently be increased.

That change will be particularly useful when the samples representing the image to be restored have been obtained by algorithm (II), which also leads to a statistical increase of the proportion of "black" samples, when a black sample is coded as a binary 1.

For obtaining a true copy of the original image, the signals delivered by the expansion system should be inverted, that is complemented. Consequently, the algorithm (III) will be substituted with an algorithm whose first line will be as follows:

$$m_{2p,2q} = \overline{\overline{N_{2p,2q}} + [\overline{N_{2p,2(q+1)}} \times \overline{N_{2(p+1),2q}}]} = N_{2p,2q} \cdot [N_{2(p+1),2q} + N_{2p,2(q+1)}] \quad \text{(IV)}$$

The other three formulae (III) will be similarly modified.

It will be understood that the complete image transmission process may be reversed, that is the binary value 1 will be used to code "white" samples during the compression process, while the expansion process will be applied on samples previously processed for binary ones to designate "black" samples. In other words, the binary signals resulting from the compression process will be inverted prior to or after transmission, but in any case before restoration.

It may then be considered that algorithm (II) is substituted with the following $$N_{2p,2q} = \overline{(n_{2p,2q} + \overline{n_{2p+1,2q+1}}) \times (n_{2p+1,2q} + \overline{n_{2p,2q+1}})} = (n_{2p,2q} \times n_{2p+1,2q+1}) + (n_{2p+1,2q} \times n_{2p,2q+1}) \quad \text{(V)}$$

It will however be appreciated that the combination of the normal expansion algorithm and inverted compression algorthm does not necessarily provide the same final result as the combination of the inverted expansion algorithm and normal compression algorithm, but in both cases, there is the same reduction of the blackening effect.

It should also be kept in mind that in certain cases the blackening effect may be of advantage, when the image to be transmitted is formed of fine lines on a white support.

Since the circuitry necessary for carrying out the modified process indicated above can be directly derived from those illustrated in FIGS. 4, 5, 6 and 8, it is not deemed necessary to provide examples thereof.

The compression process which has been described above necessarily results in a loss of some details, since the resolving power is decreased and each resulting sample is an average of four samples.

According to a further refinement of the invention, that effect is reduced and it remains possible to retain some characteristic details, such as narrow horizontal lines, bars inside small size characters, dot lines, etc. For that result, the presence of black-white transitions should be identified. It has been found that the result may be attained by taking into account samples in addition to $m_{2p,2}$, $m_{2p,2(q+1)}$, $m_{2(p+1),2q}$, $m_{2(p+1)2(q+1)}$ and located in close proximity to them.

Referring to FIG. 9, this is done by using a modified compression algorithm which takes into account not only the above-mentioned four samples (which will now be referred as a, b, c, d for more clarity), but also the compressed samples $N_s$ and $N_G$ which are already available in coded form.

Then, the compression algorithm will be:

$$N = \frac{\overline{(a+d)(b+c)\,[(\overline{a\,\overline{b}\,c\,d} + \overline{c\,\overline{d}\,a\,b})\,N_s + (a\,c\,\overline{b}\,\overline{d} + \overline{a}\,\overline{c}\,b\,d)N_G]}}{Z_1 \qquad\qquad Z_2}$$

It will be appreciated that $Z_1$ is another representation of (II) while $Z_2$ is a corrective factor.

When the image to be represented with a compressed signal is subjected to line-per-line scan, then the circuitry may be as shown in simplified form in FIG. 10.

A first shift register 70 having a number of binary positions to the number r of samples n per line. The series input 71 of the shift register receives the successive samples n. The clock input has not been shown. At a time, r samples are simultaneously available in the shift register. The four samples $a_i$, $b_i$, $c_i$ and $d_i$ corresponding to a same compressed signal to be computed are simultaneously available in the first and last binary positions of the shift register. They are applied to corresponding inputs of a logic circuit 72 which also receives the signals from the first and last portions of another shift register 73 whose serial input receives the output of logic 72. Shift register 73 will have $M+1$ binary positions (M being the number of compressed signals per line). After each line has been completed, a binary zero is introduced, for taking into account the fact that there will be a compressed sample lacking at the left of the first sample of each line. The corresponding $N_G$ will be zero.

The system of FIG. 10 may be substantially simplified if a probe comprising a matrix of separate optical transducers is used for scanning. If 12 transducers are used, each corresponding to a sampled point with an arrangement corresponding to FIG. 9 (where $N_s$ and $N_G$ each comprises four points) the logic circuit may be as indicated in FIG. 11. Input $N_s$ receives a signal which is derived from those of the corresponding four transducers by analytical summation in an operational amplifier and digitization. $N_G$ is similarly obtained. The signals appearing at several locations in FIG. 11 have been indicated so that further description appears unwarranted.

I claim:

1. Apparatus for the reconstitution of an image from binary signals $N_{o,o}$, $N_{2,o}$, ..., $N_{2p,o}$, ..., $N_{o,2q}$; $N_{2p,2q}$ representing samples of the image distributed over a two-dimensional matrix, comprising a clock at double the frequency of appearance of the elements N, a direct channel comprising a first shift memory with more than one and less than four one bit positions; a delayed channel comprising a cascaded arrangement of a shift register with a number of one-bit positions equal to the number of elements of a complete line of said image line and a second shift memory with a number of one-bit positions equal to those of the first shift memory, means for applying the elements N to said direct channel and delayed channel, clock means synchronized with the frequency of appearance of the elements N for controlling shift of said register and said memories and a set of logic gates connected to said memories to provide, in time alternation, two of the terms m of the following expansion relationship, and then two other terms, $$m_{2p,2q} = N_{2p,2q} + [N_{2(p+1),2q} \times N_{2p,2(q+1)}],$$

$$m_{2p+1,2q} = N_{2(p+1),2q} + [N_{2p,2q} \times N_{2(p+1),2(q+1)}],$$

$$m_{2p,2q+1} = N_{2p,2(q+1)} + [N_{2p,2q} \times N_{2(p+1),2(q+1)}],$$

$$m_{2p,2q+1} = N_{2(p+1),2(q+1)} + [N_{2(p+1),2q} \times N_{2p,2(q+1)}];$$

said signals m being representative of samples distributed over a matrix homothetic with that of the samples represented by the signals N, and buffer-registers connected to receive said terms in sequence.

2. Apparatus according to claim 1, wherein each said shift memory has three one-bit positions, said register is connected to receive clock pulses at the frequency of elements N and said memories are connected to receive clock pulses at the double frequency.

3. Apparatus according to claim 1, wherein each memory has two one-bit positions, wherein the memories and registers are connected to receive clock pulses at the frequency of the N elements, and the set of logic gates includes an additional memory with one one-bit position clocked at double the frequency in each channel.

4. Apparatus for the remote reproduction of images comprising a reconstitution apparatus according to any one of claims 1 to 3, further including a data compression coding apparatus to generate samples N from samples n of said image comprising circuit means for temporarily storing selected ones of said samples n of said image and circuit means for an on line combination of said stored signals and said non-stored signals so as to generate a compressed signal according to the algorithm:

$$N_{2p,2q} = [n_{2p,2q} \times n_{2p+1,2q}] + [n_{2p,2q+1} \times n_{2p+1,2q+1}] + [n_{2p,2q} \times n_{2p,2q+1}] + [n_{2p+1,2q} \times n_{2p+1,2q+1}].$$

5. Apparatus according to claim 4, comprising an image analyser which supplies samples n of a same line to a commutating switch which routes the samples of the even lines to a first channel and the samples of the odd lines to a second channel, one of said channels including a shift register having a number of binary positions equal to the number of said samples n in one line and each of the channels including a shift memory with one or two positions, said memories and said register being shifted at a frequency a half or equal to the sampling frequency, and further comprising a set of logic gates whose inputs are connected to the inputs and outputs of the shift memories and which sequentially deliver said elements N on their outputs, and a shift register actuated at half the sampling frequency and connected to receive said elements N.

6. Apparatus according to claim 4, further comprising means for inverting the signals delivered by said data compression apparatus prior to applying them to the reconstitution apparatus and for inverting the signals delivered by said reconstitution apparatus prior to display of the reproduction.

7. System for the remote reproduction of an image, comprising a reconstruction apparatus according to claim 1, 2 or 3 and a data compression and coding apparatus to generate samples N from initial samples n resulting from a scan of said image in accordance with the algorithm:

$$N_{2p,2q} = N = \overline{(a+d)(b+c)[\overline{(abcd + cdab)}N_s + \overline{(acbd + acbd)}N_G]}$$

wherein $N_s$ and $N_G$ designate, respectively, the values of N for the element of the same column of the preceding line and for the preceding element in the same line as N and wherein a, b, c and d designate $n_{2p,2q}$; $n_{2p+1,2q}$; $n_{2p,2q+1}$; and $n_{2p+1,2q+1}$, respectively.

* * * * *